(12) United States Patent
Khalili Moghaddam et al.

(10) Patent No.: US 12,163,883 B2
(45) Date of Patent: Dec. 10, 2024

(54) HOLOGRAPHIC SENSOR

(71) Applicant: Cambridge Enterprise Limited, Cambridge (GB)

(72) Inventors: Gita Khalili Moghaddam, Cambridge (GB); Christopher Robin Lowe, Cambridge (GB); Jeffrey Blyth, Brighton (GB)

(73) Assignee: Cambridge Enterprise Limited, Cambridge (GB)

( * ) Notice: Subject to any disclaimer, the term of this patent is extended or adjusted under 35 U.S.C. 154(b) by 101 days.

(21) Appl. No.: 17/792,017

(22) PCT Filed: Jan. 13, 2021

(86) PCT No.: PCT/GB2021/050068
§ 371 (c)(1),
(2) Date: Jul. 11, 2022

(87) PCT Pub. No.: WO2021/144563
PCT Pub. Date: Jul. 22, 2021

(65) Prior Publication Data
US 2023/0053938 A1    Feb. 23, 2023

(30) Foreign Application Priority Data
Jan. 13, 2020  (GB) .................................... 2000475

(51) Int. Cl.
*G01N 21/45*    (2006.01)
*G01N 21/77*    (2006.01)

(52) U.S. Cl.
CPC ....... *G01N 21/453* (2013.01); *G01N 21/7743* (2013.01); *G01N 2021/7776* (2013.01)

(58) Field of Classification Search
CPC .. G01N 21/78; G01N 21/7743; G01N 21/453; G01N 21/4788; G01N 2021/7776;
(Continued)

(56) References Cited

U.S. PATENT DOCUMENTS 6,395,302 B1 *  5/2002  Hennink .............. A61K 9/1664
                                                  424/490
2006/0063038 A1 *  3/2006  Lowe ....................... G02B 5/32
                                                  252/586
(Continued)

FOREIGN PATENT DOCUMENTS

EP    2192409 A1   6/2010

OTHER PUBLICATIONS

Yang et al. Towards the real-time monitoring of glucose in tear fluid: Holographic glucose sensors with reduced interference from lactate and pH. Biosensors and Bioelectronics Elsevier Science Ltd. Dec. 20, 2007.
(Continued)

*Primary Examiner* — Sang H Nguyen
(74) *Attorney, Agent, or Firm* — Withers Bergman LLP; John C. Serio (57) ABSTRACT

The present invention relates to sensors for detecting the presence or measuring the concentration of a target analyte, the sensor comprising: (i) a first phase comprising a first crosslinked polymer; (ii) a second phase comprising a second crosslinked polymer; and (iii) a target analyte recognition agent; the first phase and second phase arranged to form an optical grating. The first crosslinked polymer comprises low amounts of a crosslinking agent. The present invention also relates to methods of making a sensor for detecting the presence or measuring the concentration of a target analyte.

8 Claims, 2 Drawing Sheets

(58) Field of Classification Search
CPC ... H03H 2001/0432; G03H 2001/0033; G03H 2001/0044; G03H 2001/0439; G03H 2001/043; G03H 2001/0417; G03H 2001/2615

See application file for complete search history.

(56) References Cited

U.S. PATENT DOCUMENTS

| | | | |
|---|---|---|---|
| 2006/0293461 A1* | 12/2006 | Jiang | C08F 210/06 525/240 |
| 2007/0153343 A1* | 7/2007 | Blyth | G02B 5/32 359/15 |
| 2007/0265391 A1* | 11/2007 | Yang | C09D 143/04 526/279 |
| 2010/0167416 A1 | 7/2010 | Kabilan et al. | |
| 2012/0136125 A1* | 5/2012 | Rousseau | C08G 59/5006 525/523 |
| 2017/0256818 A1* | 9/2017 | Eitouni | H01M 10/052 |

OTHER PUBLICATIONS

Khalili Moghaddam Gita et al. A transparent glucose-sensitive double polymerised hologrpahic sensor. Aug. 1, 2018.

Wang Xiaoqui et al. Hydrogel diffraction grating as sensor: A tool for studying volume phase transition of thermo-responsive hydrogel. Aug. 14, 2014.

Ali K. Yetisen et al. Holographic Sensors: Three-Dimensional Analyte-Sensitive Nanostructures and Their Application. Oct. 22, 2014.

International Search Report and Written Opinion in corresponding application No. PCT/GB2021/050068 dated Mar. 23, 2021.

* cited by examiner

HOLOGRAPHIC SENSOR

CROSS REFERENCE TO RELATED APPLICATIONS

This application is a national stage application, filed under 35 U.S.C. § 371, of international application No. PCT/GB2021/050068, filed Jan. 13, 2021, which claims the benefit of GB Application No. 2000475.0, filed Jan. 13, 2020, entitled "A HOLOGRAPHIC SENSOR". The entire contents of the aforementioned applications are incorporated herein by reference.

FIELD OF THE INVENTION

The invention relates to sensors and methods of manufacturing sensors for detecting the presence of or measuring the concentration of a target analyte.

BACKGROUND TO THE INVENTION

Point-of-Care (POC) diagnostics are conducted where care is enacted, e.g. workplace, roadside, bedside or home. These in vitro tests are used to analyse qualitatively or quantitatively analytical targets such as proteins, DNA, metabolites, drugs and cells in readily accessible human fluid samples (blood, urine, saliva, sweat) as well as subcutaneous fluid. An ideal POC platform should be cost-effective and provide real-time, easily interpreted responses to the presence and/or concentration of target analytes. Of the analytical technologies that potentially meet these requirements, colorimetric POC diagnostics are particularly favoured because of their simple colour-based readout.

The mechanism of colour generation in most colorimetric POC diagnostic developments is transition metal-based. An example of this technology is a fluorescent sensor array for peptides based on transition metal compounds. Because of their low cost and accessibility, transition metal-based colorimetric techniques have been successful. However, transition metal-based colorimetric techniques have restricted applicability because the generation of colour requires interaction with specific analytes, meaning that they are difficult to modify to target other analytes. Therefore, a colour generating platform that is agnostic to the target analyte is desirable. To address this need, structural colorimetry has been proposed.

Structural colorimetry involves two complementary mechanisms in which an analyte-specific mechanism induces a generic colour change mechanism by means of structural colouration. Diffraction gratings have been proposed as particularly suitable structural colour producers for use in POC diagnostics because diffraction gratings are able to be manufactured flexibly, and thus are economically and technically more palatable in industries such as the healthcare industry.

Diffraction gratings comprise an ordered arrangement of scattering centres or gratings which diffract an incident plane light wave into a number of plane waves travelling in different directions. Diffraction gratings can selectively diffract incident light waves of specific wavelengths, which can result in visible colour generation. The specific wavelengths of light that are diffracted by media through which incident light travels depend upon the refractive index of the media. Consequently, diffraction gratings may be formed within a material by forming an orderly alternating arrangement of sections or phases within the material, each phase having a different refractive index. The refractive index of the phases may be modified such that the wavelength of light that is diffracted can be tuned, for example, to the visible part of the electromagnetic spectrum. In addition, the specific wavelengths of light that are diffracted depend upon the spacing between gratings, meaning that changes to the grating spacing will change the wavelength of light that is diffracted, resulting in an observable colour change when the grating spacing changes. The change in diffracted wavelength is commonly termed the wavelength shift ($\Delta\lambda$).

Sensors comprising a diffraction grating which is able to provide a visual indication of the presence and amount of certain target analytes have been proposed based on the foregoing background. This visual indication is brought about by a change in the optical characteristics of the diffraction grating resulting from physical variation of the sensor upon interaction with the target analyte, for example, a change in grating spacing induced by the target analyte interacting with the sensor.

A specific class of diffraction gratings that have been proposed for use in POC diagnostics are holographic gratings, used in holographic sensors. An earlier holographic sensor disclosed by Domschke, A. et al. in "Initial clinical testing of a holographic non-invasive contact lens glucose sensor", Diabetes Technol. Ther., vol. 8, (2006), pp 89-93 used silver nanoparticles to generate the holographic grating. However, silver nanoparticles require a complex regulatory process to be approved by the U.S. Food and Drug Administration and are aesthetically unappealing in that they impart a strong colour to the holographic sensor.

In order to overcome the aforementioned drawbacks of silver nanoparticles, a metal-free, transparent, glucose-sensitive holographic sensor has been disclosed by Moghaddam, G. K. et al. in "A transparent glucose-sensitive double polymerised holographic sensor", Sensors and Actuators B, vol. 267, (2018), pp 1-4. This holographic sensor was made using a so-called double polymerisation method. In this approach, a holographic grating is formed by orderly modulation of the refractive index within the material. This is achieved by ordered polymerisation of a second, more highly crosslinked polymer (P2) within a first, lightly crosslinked polymer (P1). The polymerisation of P2 is a function of the standing wave, where, in the light regions, the exposure strongly promotes polymerisation, whilst in the dark regions, little or no polymerisation is promoted. Consequently, a sinusoidal concentration profile of P2 is formed that modulates the permittivity of the polymer material and generates a grating structure. For sensor applications, polymer P1 is functionalised with 3-acrylamido-phenylboronate (3-APB) to develop a glucose-responsive "smart" hydrogel. In the presence of glucose, the functionalised polymer P1 swells and contracts, causing the grating spacing to change. This double polymerisation approach is said to be robust and is said to generate a transparent final product which can be configured for use in daily-wear contact lenses.

One criterion that a sensor should satisfy is that the dynamic range of the sensor must be large enough to distinguish between analyte concentrations across a broad range. In other words, the sensor must be able to detect and distinguish between a range of target analyte concentrations. In sensors using diffraction gratings, this range is determined by the range of target analyte concentrations across which a wavelength shift can be distinguished and can be compared between sensors by comparing the wavelength shifts of the sensors in response to a fixed quantity of target analyte. Furthermore, the sensitivity of sensors, for example measured by the wavelength shift per mM of target analyte, should be optimised.

Not only is there a need for sensors which can easily be modified to be capable of detecting different target analytes, but there is a need for sensors that are tuneable for the target analyte, particularly to its concentration range in the biological fluid.

It is therefore an object of the present invention to provide a sensor having an improved sensitivity to the target analyte. It is also an object of the present invention to provide a sensor having an improved dynamic range. It is also an object of the present invention to provide a sensor that can be tuned to be used with different target analytes.

SUMMARY OF THE INVENTION

An aspect of the invention relates to a sensor for detecting the presence or measuring the concentration of a target analyte, the sensor comprising:
(i) a first phase comprising a first crosslinked polymer;
(ii) a second phase comprising a second crosslinked polymer; and
(iii) a target analyte recognition agent;
the first phase and second phase arranged to form an optical grating;
wherein the first crosslinked polymer comprises 1 mol % or less of a crosslinking agent by mol of monomers in the first crosslinked polymer.

Another aspect of the invention relates to a sensor for detecting the presence or measuring the concentration of a target analyte, the sensor comprising:
(i) a first phase comprising a first crosslinked polymer;
(ii) a second phase comprising a second crosslinked polymer; and
(iii) a target analyte recognition agent;
the first phase and second phase arranged to form an optical grating;
wherein the first crosslinked polymer is obtained by polymerising a prepolymer composition comprising 1 mol % or less of a crosslinking agent by mol of the prepolymer composition.

Another aspect of the invention relates to a sensor for detecting the presence or measuring the concentration of a target analyte, the sensor comprising:
(i) a first phase comprising a first crosslinked polymer;
(ii) a second phase comprising a second crosslinked polymer; and
(iii) a target analyte recognition agent;
the first phase and second phase arranged to form an optical grating;
wherein the first crosslinked polymer is obtained by polymerising a prepolymer composition comprising 1 parts by mol or less of a crosslinking agent with respect to 100 parts by mol of monomers.

Another aspect of the invention relates to a substrate comprising the sensor according to the invention.

Another aspect of the invention relates to an array comprising at least two sensors according to the invention.

Another aspect of the invention relates to the use of a sensor according to the invention, to monitor the presence of or concentration of an analyte.

Another aspect of the invention relates to a method for making a sensor for detecting the presence or measuring the concentration of a target analyte, the method comprising:
(i) polymerising a first prepolymer composition comprising 1 mol % or less of a crosslinking agent by mol of the first prepolymer composition to form a first phase comprising a first crosslinked polymer;
(ii) introducing a second prepolymer composition into the first phase; and
(iii) polymerising the second prepolymer composition to form a second phase comprising a second crosslinked polymer such that an optical grating is formed by the first and second phases;
wherein one of the first and second crosslinked polymers comprises a target analyte recognition agent.

Another aspect of the invention relates to a method for making a sensor for detecting the presence or measuring the concentration of a target analyte, the method comprising:
(i) polymerising a first prepolymer composition comprising 1 parts by mol or less of a crosslinking agent with respect to 100 parts by mol of monomers to form a first phase comprising a first crosslinked polymer
(ii) introducing a second prepolymer composition into the first phase; and
(iii) polymerising the second prepolymer composition to form a second phase comprising a second crosslinked polymer such that an optical grating is formed by the first and second phases;
wherein one of the first and second crosslinked polymers comprises a target analyte recognition agent.

BRIEF DESCRIPTION OF DRAWINGS

The invention is described with reference to the accompanying drawings, wherein.

DETAILED DESCRIPTION OF THE INVENTION

The sensors of the present invention provide improved sensitivity and a broad dynamic range for a target analyte. In particular, this broad dynamic range is tuneable for the target analyte. Unlike previous sensors that incorporate silver nanoparticles to form a hologram, the sensors of the present invention use a mixture of polymers to form phases having different refractive indices to form an optical grating. This addresses the drawbacks associated with sensors that incorporate silver nanoparticles. The sensor of the present invention can easily be modified to be capable of detecting different target analytes. In an aspect of the invention, multiple sensors according to the present invention, each comprising a target analyte recognition agent for a different target analyte, can be combined to form an array capable of simultaneously detecting multiple different target analytes. Upon detection of the target analyte, a physical change, such as contraction or swelling, of the sensor occurs such that the optical characteristics of the optical grating are altered. Any physical change in the sensor that alters the spacing of the fringes of the optical grating or the average refractive indices alters these optical characteristics, generating an observable change in diffracted wavelength (colour) and/or intensity (brightness).

The inventors have surprisingly found that by reducing the amount of crosslinking agent in the first crosslinked polymer used to form the sensor, the sensitivity and dynamic range of the sensor can be significantly improved. Therefore, in an aspect of the invention the first crosslinked polymer comprises 1 mol % or less of a crosslinking agent by mol of monomers in the first crosslinked polymer. In another aspect of the invention the first crosslinked polymer is obtained by polymerising a prepolymer composition comprising 1 mol % or less of a crosslinking agent by mol of the prepolymer composition. In another aspect of the invention the first crosslinked polymer is obtained by polymerising a prepolymer composition comprising 1 parts by mol or less of a crosslinking agent with respect to 100 parts by mol of monomers.

Further, in some embodiments, a cleavable crosslinking agent is used to prepare the first crosslinked polymer to enable the final crosslinking density of the first crosslinked polymer to be reduced whilst maintaining the physical strength of the sensor during manufacture.

In some embodiments, the difference between the refractive indices of the first and second phases are controlled and optimised to produce a bright hologram and accurately measure the concentration of the target analyte of interest.

In particular, the sensor of the present invention may be utilised to measure reliably and accurately glucose levels for the management of diabetes.

Still further, it has advantageously been found that the sensor according to the present invention may be utilised in a multitude of different applications which will be described in more detail below. Sensors according to the present invention can monitor target analyte levels in various bodily fluids, such as blood sera, saliva, urine, tear fluid and sweat. The sensors may be combined with various substrates, such as paper, textiles and films. In a particular embodiment, the sensors may be incorporated within a contact lens to monitor target analyte levels, such as glucose, in ocular fluid. In another embodiment, it has been advantageously found that the sensors according to the present invention can be implanted into the skin, akin to a tattoo, and be used to measure target analyte levels, such as glucose. In another embodiment, the sensors may be incorporated within a strip, such as a single-use strip, and be used to measure target analyte levels.

Optical Grating

The sensors according to the present invention comprise an optical grating. By "optical grating" is meant a periodic structure that diffracts an incident beam of light. It will be appreciated by a skilled person that the optical grating in the present invention is formed by a periodic modulation of the refractive index, which is achieved by the sensor comprising a first phase having a first refractive index and a second phase having a second, different refractive index. By arranging the first and second phases having different refractive indices periodically and with an appropriate spacing, the first and second phases form an optical grating. It will also be appreciated by a skilled person that because the optical grating is formed throughout the thickness of the first and second phases, the optical grating may alternatively be termed a volume grating, or volume Bragg grating. It should be appreciated that the optical grating is capable of selectively diffracting light with narrow ranges of wavelengths which fulfil the Bragg condition, whilst wavelengths of light that do not fulfil the Bragg condition are weakly diffracted or not diffracted. Accordingly, the light that is selectively diffracted by the optical grating may be monitored. A skilled person is aware of how to tune the optical grating to diffract different wavelengths of light. In a preferred embodiment the optical grating is tuned so that the light diffracted by the optical grating has a wavelength within the visible or infra-red region of the electromagnetic spectrum, for example, between 380 and 760 nm, or in the near IR range. This enables the light that is diffracted by the optical grating to be monitored without specialised equipment, such as spectrometers.

In order to form the optical grating by the sensor comprising a first phase having a first refractive index and a second phase having a second, different refractive index, the sensor is produced using so-called double polymerisation. The first phase comprises a first crosslinked polymer which may be produced using any known method of polymerisation. The second phase comprises the second crosslinked polymer and may also comprise the first crosslinked polymer. Polymerisation of the second prepolymer composition is initiated by photoexcitation such that polymerisation to provide the second crosslinked polymer is a function of the standing sinusoidal wave irradiating the second prepolymer composition. Suitable polymerisation methods to produce the second crosslinked polymer therefore include, but are not limited to photoinitiated polymerisation, such as free-radical polymerisation initiated by a photoinitiator.

The optical grating may alternatively be referred to as a volume grating, or volume Bragg grating. The optical grating may be a transmission grating or a reflection grating. By "transmission grating" is meant that the grating allows incident light that fulfils the Bragg condition to be transmitted, as well as being diffracted. By "reflection grating" is meant that the grating reflects incident light that fulfils the Bragg condition, as well as being diffracted. In a preferred embodiment the sensor is incorporated into a contact lens. It will be appreciated that in this embodiment the optical grating should be a reflection grating so that diffracted light can be monitored whilst the contact lens is being worn in the eye. In another embodiment the sensor is incorporated into a strip. It will be appreciated that in this embodiment either a transmission grating or a reflection grating may be used.

A skilled person is aware of standard refractometric methods that may be used to measure the refractive index.

In an embodiment of the invention, the optical grating is a volume hologram. In an embodiment of the method of the invention, the optical grating is produced by recording the optical grating, as a volume hologram, during polymerisation to produce the second crosslinked polymer. A skilled person is aware of appropriate methods for recording a volume hologram, and an exemplary method is provided below.

The first phase comprising the first crosslinked polymer is prepared. A second prepolymer composition is then introduced into the first phase. The second prepolymer composition is then irradiated with appropriate radiation. In regions of peak amplitude in the irradiating wave, i.e. regions of intense exposure "light regions", polymerisation is strongly maximised over regions of low amplitude "dark regions". The consumption of monomers in regions of peak amplitude creates a concentration gradient that initiates diffusion of the excess monomers from dark regions to the light regions. Consequently, a sinusoidal concentration, i.e. a periodic distribution, of the second crosslinked polymer is formed within the network of the first crosslinked polymer that modulates the refractive index of the material and generates an optical grating structure. Therefore the second phase may comprise the first crosslinked polymer in addition to the second crosslinked polymer.

In order to record a hologram with this method the second prepolymer composition is irradiated with at least two beams of coherent light that interfere with each other in order to establish a standing wave interference pattern within the second prepolymer composition. The two beams of coherent light may illuminate the second prepolymer composition from the same side of the second prepolymer composition, in which case a volume transmission hologram will be formed. Alternatively, the two beams of coherent light may illuminate the second prepolymer composition from different sides of the second prepolymer composition, in which case a volume reflection hologram will be formed. A suitable method for the latter case involves placing a mirror on one side of the second prepolymer composition and irradiating the mirror through the second prepolymer composition with one beam of coherent light, wherein the beam of light reflected by the mirror is reflected back through the second prepolymer composition and interferes with the incident beam of light. The mirror may be plane, convex, concave, ellipsoidal or a corner cube system.

Target Analyte

The sensors according to the present invention may be utilised to detect the presence of or measure the concentration of any suitable target analyte. Suitable target analytes include those that interact with the target analyte recognition agent incorporated within the sensor.

Suitable target analytes include, but are not limited to: gases; ions such as $PO_4^{3-}$, $Cl^-$, $H^+$, $Na^+$, $K^+$, $NH_4^+$, $Ca^{2+}$, $Mg^{2+}$, heavy metals such as $Cu^{2+}$, $Cd^{2+}$, $Hg^{2+}$, pH; volatile organics such as alkanes, alkenes, alkynes, aldehydes and ketones, in particular acetone; metabolites such as glucose, lactate, urea and other metabolites acted on by lytic or redox enzymes; drugs including antibiotics such as penicillin, therapeutic drugs, illicit and date rape drugs; enzymes including lytic enzymes such as proteases, carbohydrases and lipases; enzyme inhibitors such as cholinesterase inhibitors; and oxidase substrates. Preferably, the target analyte is selected from glucose, lactate, urea and other metabolites acted on by oxidase or lytic enzymes; and pH. More preferably, the target analyte is selected from glucose, lactate, urea and other metabolites acted on by oxidase or lytic enzymes. Most preferably, the target analyte is glucose. It will therefore be appreciated that the sensors are preferably utilised to monitor glucose levels for the management of diabetes in humans.

Target Analyte Recognition Agent

The sensors comprise a target analyte recognition agent. By "target analyte recognition agent" is meant a chemical or biological structure that interacts with or binds a specific chemical group, ion, molecule or macromolecule that is or is a part of the target analyte. For example, the target analyte recognition agent may have a high affinity for the target analyte. The target analyte recognition agent may form attractive intermolecular forces with the target analyte, or the target analyte recognition agent may react with the analyte to form an intramolecular bond with the target analyte.

The target analyte recognition agent may be incorporated into the first crosslinked polymer. The target analyte recognition agent may be incorporated into the second crosslinked polymer. The target analyte recognition agent may not be chemically bound to the first and/or second crosslinked polymer, but may be dispersed within the polymer network of the first and/or second crosslinked polymer. Alternatively, the target analyte recognition agent may be incorporated into the first and/or second crosslinked polymer, either by functionalising the polymer after polymerisation or as a monomer containing the target analyte recognition agent.

Whilst the interaction between the target analyte and the recognition agent would normally be reversible, some applications of the technology may require an irreversible interaction in order to act as proof of the presence of the analyte. However, preferably the target analyte recognition agent is a reversible target analyte recognition agent. By "reversible target analyte recognition agent" is meant that the target analyte recognition agent can form an interaction with the target analyte to form a "bound state" and the interaction can be reversed to return the target analyte recognition agent and the target analyte to an "unbound state", i.e. the target analyte binds to the recognition agent reversibly.

Upon exposure of the sensor to the target analyte, it will be appreciated by a skilled person that the (reversible) interaction of the target analyte recognition agent with the target analyte causes a physical change to occur in the sensor. It will also be appreciated that the magnitude of the physical change is dependent upon the concentration of the target analyte. Accordingly, depending upon the presence and levels of the target analyte to which the sensor is exposed, expansion and contraction of the sensor may occur, causing the spacing of the periodic structure of the optical grating to be altered, hence changing the wavelength of light diffracted by the optical grating. The optical properties of the optical grating of the sensor are therefore altered, and a visual indication of the presence and concentration of the target analyte provided.

Suitable target analyte recognition agents include, but are not limited to natural and synthetic receptors, such as crown ethers, cyclodextrins, calixarenes, porphyrins, DNA aptamers, cucurbiturils, cyclopeptides, antibodies or fragments derived therefrom, tweezer ligands, sterically-geared tripods and several types of sugar and metal complexes.

Preferably, the target analyte recognition agent is selected from a phenylboronic acid, benzoboroxole and 5-amino-2-hydroxymethylphenyl boronic acid (benzoboroxole).

Monomer Containing the Target Analyte Recognition Agent

Preferably, the target analyte recognition agent is incorporated into the first and/or second crosslinked polymer as a monomer containing the target analyte recognition agent. By "monomer containing the target analyte recognition agent" is meant that the target analyte recognition agent is a moiety of the monomer, i.e. the target analyte recognition agent is chemically bonded to the monomer. Accordingly, the monomer containing the target analyte recognition agent is incorporated into the first and/or second crosslinked polymer during polymerisation of the prepolymer composition used to form the first and/or second crosslinked polymer. Accordingly, the monomer containing the target analyte recognition agent can be selected depending upon the target analyte in order to prepare a sensor for that target analyte.

Suitable monomers containing the target analyte recognition agent include, but are not limited to methacrylic acid, 1-vinylimidazole, 2-(dimethylaminoethyl) methacrylate, 3-(acrylamido) phenylboronic acid, 2-(acrylamide) phenylboronic acid, N-(1-Hydroxy-1,3-dihydro-benzo[c][1,2]oxaborol-6-yl)-acrylamide and 4-vinylphenylboronic acid.

When the target analyte is glucose, the monomer containing the target analyte recognition agent may be selected from a variety of acrylic or methacrylic derivatives of organoboron families of boric acid including, but not limited to, boronic acids ($R-B(OH)_2$), borinic acids ($R_2B-OH$), bis-boronates (chiral binaphthol and bis-boronate bipyridinium salts), guanidino-boronates and benzoboroxole.

Preferably, the monomer containing the target analyte recognition agent is 3-acrylamidophenyl boronic acid (3-APB), 2-acrylamidophenyl boronic acid (2-APB) or N-(1-Hydroxy-1,3-dihydro-benzo[c][1,2]oxaborol-6-yl)-acrylamide.

Preferably, the monomer containing the target analyte recognition agent is 3-acrylamidophenyl boronic acid.

The monomer containing the target analyte recognition agent may be N-(1-Hydroxy-1,3-dihydro-benzo[c][1,2]oxaborol-6-yl)-acrylamide.

First Crosslinked Polymer

It will be appreciated by a skilled person that the first crosslinked polymer may be obtained by any known method of polymerisation. Suitable methods of polymerisation include, but are not limited to chain (or addition)-reactions and step (or condensation)-reactions in emulsions, solution, suspension and precipitation using free-radical, ionic, coordination, graft or photoinitiation.

It will be appreciated by a skilled person that crosslinked polymers do not dissolve in solvent because of the crosslinks formed between adjacent polymer chains. Rather, crosslinked polymers swell in an appropriate solvent and form a gel, such as a hydrogel or an organogel. Typically, the target analyte will be present in water. However, the target analyte may be present in other solvents, such as an organic solvent. Accordingly, upon interaction with the target analyte, the crosslinked polymers of the sensor are able to expand and/or contract.

In some embodiments of the invention the first crosslinked polymer is obtained by polymerising a prepolymer composition comprising a crosslinking agent. It will be appreciated by a skilled person that the prepolymer composition further comprises suitable monomers, oligomers and/or polymers to produce the first crosslinked polymer.

It will be appreciated by a skilled person that the first crosslinked polymer may be obtained by crosslinking a polymer comprising the monomers disclosed elsewhere in this specification with a crosslinking agent. Alternatively it will be appreciated by a skilled person that the first crosslinked polymer may be obtained by polymerising a mixture containing the crosslinking agent and suitable monomers.

It will be appreciated by a skilled person that at least some of the monomers used to form the first crosslinked polymer must be capable of forming crosslinks in order to form the first crosslinked polymer. By "crosslink" is meant a covalent bond that links one polymer chain to another.

The first crosslinked polymer may be a polymer or copolymer. The first crosslinked polymer may be formed from any suitable monomers.

The first crosslinked polymer may be formed from monomers containing the target analyte recognition agent disclosed elsewhere in this specification. In an embodiment the prepolymer composition that is polymerised to form the first crosslinked polymer comprises a monomer containing the target analyte recognition agent disclosed elsewhere in this specification.

The first crosslinked polymer may be formed from further monomers, including, but not limited to acrylic acid, acrylamide, methacrylamide, allyl monomers, vinyl monomers and combinations thereof. In an embodiment the further monomers are selected from acrylamide, 2-hydroxyethyl methacrylate, N-[3-(dimethylamino)propyl] methacrylamide and combinations thereof Preferably the further monomers are acrylamide and N-[3-(dimethylamino)propyl] methacrylamide.

In a highly preferred embodiment the first crosslinked polymer is obtained by polymerising a prepolymer composition comprising N,N'-methylenebis(acrylamide) as the crosslinking agent, 3-(acrylamido) phenylboronic acid as the monomer containing the target analyte recognition agent, and acrylamide and N-[3-(dimethylamino)propyl] methacrylamide as further monomers.

In a highly preferred embodiment the crosslinking agent is N,N'-methylenebis(acrylamide) and the first crosslinked polymer is a copolymer of N,N'-methylenebis(acrylamide), 3-(acrylamido) phenylboronic acid, acrylamide and N-[3-(dimethylamino)propyl] methacrylamide.

In an embodiment the first crosslinked polymer is obtained by polymerising monomers having one ethylenically unsaturated group with the crosslinking agent. In an embodiment the monomers having one ethylenically unsaturated group comprise a monomer containing a target analyte recognition agent, as defined in this specification. In an embodiment the monomers having one ethylenically unsaturated group comprise further monomers having one ethylenically unsaturated group. Suitable monomers having one ethylenically unsaturated group include, but are not limited to acrylamide, 2-hydroxyethyl methacrylate, N-[3-(dimethylamino)propyl] methacrylamide and combinations thereof. In a particularly preferred embodiment the crosslinking agent is N,N'-methylenebis(acrylamide) and the monomers having one ethylenically unsaturated group comprise a combination of acrylamide, 3-(acrylamido) phenylboronic acid and N-[3-(dimethylamino)propyl] methacrylamide.

Second Crosslinked Polymer

It will be appreciated by a skilled person that the second crosslinked polymer must be produced by photoinitiated polymerisation for the first and second crosslinked polymers to form the optical grating of the sensor. The second crosslinked polymer may comprise the same monomer units as the first crosslinked polymer, provided that they are suitable for photoinitiated polymerisation. The first and second crosslinked polymers may be the same polymer or copolymer, but differ by their crosslinking density. Alternatively, the second crosslinked polymer may comprise different monomer units to the first crosslinked polymer. The second crosslinked polymer may be a polymer or copolymer. The second crosslinked polymer may be formed from any suitable monomers for photoinitiated polymerisation.

The second phase has a different refractive index to the first phase. A skilled person will appreciate that this may be achieved by the second crosslinked polymer having a different crosslinking density to the first crosslinked polymer. A skilled person is capable of controlling crosslinking densities, for example, by controlling the amount of crosslinking agent used to produce the crosslinked polymers. For example, in an embodiment the second crosslinked polymer is obtained by polymerising a prepolymer composition comprising 35 mol % or more of a crosslinking agent by mol of the prepolymer composition. In an embodiment the second crosslinked polymer is obtained by polymerising a prepolymer composition comprising 91 mol % or less of a crosslinking agent by mol of the prepolymer composition. The second crosslinked polymer may comprise 35 mol % or more of a crosslinking agent by mol of monomers in the second crosslinking agent. The second crosslinked polymer may comprise 91 mol % or less of a crosslinking agent by mol of monomers in the second crosslinking agent In some embodiments of the invention the second crosslinked polymer is obtained by polymerising a prepolymer composition comprising a crosslinking agent. It will be appreciated by a skilled person that the prepolymer composition further comprises suitable monomers, oligomers and/or polymers to produce the second crosslinked polymer by photoinitiated polymerisation.

A skilled person is aware of suitable monomers for photoinitiated polymerisation. Suitable monomers for photoinitiated polymerisation include, but are not limited to: acrylamide, 2-hydroxyethyl methacrylate and N-[3-(dimethylamino)propyl] methacrylamide and combinations thereof.

It will be appreciated by a skilled person that at least some of the monomers used to form the second crosslinked polymer must be capable of forming crosslinks in order to form the second crosslinked polymer.

The second crosslinked polymer may be formed from monomers containing the target analyte recognition agent disclosed elsewhere in this specification, provided that the monomer containing the target analyte recognition agent is suitable for photoinitiated polymerisation. In an embodiment the prepolymer composition that is polymerised to form the second crosslinked polymer comprises a monomer containing the target analyte recognition agent disclosed elsewhere in this specification, provided that the monomer containing the target analyte recognition agent is suitable for photoinitiated polymerisation.

In a highly preferred embodiment the second crosslinked polymer is obtained by polymerising a prepolymer composition comprising N,N'-methylenebis(acrylamide) as the crosslinking agent and acrylamide.

In a highly preferred embodiment the crosslinking agent is N,N'-methylenebis(acrylamide) and the second crosslinked polymer is a copolymer of acrylamide and N,N'-methylenebis(acrylamide).

Crosslinking Agent

A skilled person is aware of crosslinking agents. By "crosslinking agent" is meant a molecule that is capable of forming a covalent bond between two or more polymer chains (crosslinks), and wherein the crosslinks formed by the crosslinking agent are stable under specific conditions. As used herein, "crosslinking agent" is distinguished from "cleavable crosslinking agent" in that a cleavable crosslinking agent forms crosslinks that are unstable when exposed to the same specific conditions as the crosslinks formed by the crosslinking agent. In this sense, the "crosslinking agent" may alternatively be referred to as a "non-cleavable crosslinking agent". For example, the specific conditions may be exposure to a cleaving agent that reacts with the crosslink formed by the cleavable crosslinking agent and thereby breaks the covalent bonds between the adjacent polymer chains formed by the cleavable crosslinking agent, but the reagent does not interact with the crosslinks formed by the (non-cleavable) crosslinking agent.

In an aspect of the invention the first crosslinked polymer comprises 1 mol % or less of a crosslinking agent by mol of monomers in the first crosslinked polymer. In another aspect of the invention the first crosslinked polymer is obtained by polymerising a prepolymer composition comprising 1 mol % or less of a crosslinking agent by mol of the prepolymer composition. In another aspect of the invention the first crosslinked polymer is obtained by polymerising a prepolymer composition comprising 1 parts by mol or less of a crosslinking agent with respect to 100 parts by mol of monomers. The inventors have surprisingly found that by reducing the amount of crosslinking agent in the first crosslinked polymer used to form the sensor, the sensitivity and dynamic range of the sensor can be significantly improved.

By "by mol of monomers in the first/second crosslinked polymer" is meant that the amount is by the total mole of monomers in the crosslinked polymer. Therefore, components that are not incorporated into the final crosslinked polymer, such as solvent and photoinitiator, are not to be included in the calculation of mol %.

By "by mol of the prepolymer composition" is meant that the amount is by mole of the components that will be incorporated into the final crosslinked polymer. Therefore, components in the prepolymer composition that are not incorporated into the final crosslinked polymer, such as solvent and photoinitiator, are not to be included in the calculation of mol %.

By "by mol of monomers" is meant that the amount is by mole of the monomers in the prepolymer composition used to produce the crosslinked polymer. Therefore, components that are not incorporated into the final crosslinked polymer, such as solvent and photoinitiator, are not to be included in the calculation of mol %.

Preferably the first crosslinked polymer comprises 0.1 mol % or more of the crosslinking agent by mol of monomers in the first crosslinked polymer. In order to preserve the mechanical strength of the first crosslinked polymer and increase the stability of the sensor, it is preferred to incorporate 0.3 mol % or more crosslinking agent into the first crosslinked polymer by mol of monomers in the first crosslinked polymer. In an embodiment the first crosslinked polymer comprises 0.6 mol % or less of the crosslinking agent by mol of monomers in the first crosslinked polymer.

Preferably the first crosslinked polymer is obtained by polymerising a prepolymer composition comprising 0.1 mol % or more of the crosslinking agent by mol of the prepolymer composition. In order to preserve the mechanical strength of the first crosslinked polymer and increase the stability of the sensor, it is preferred that the first crosslinked polymer is obtained by polymerising a prepolymer composition comprising 0.3 mol % or more crosslinking agent by mol of the prepolymer composition. In an embodiment the first crosslinked polymer is obtained by polymerising a prepolymer composition comprising 0.6 mol % or less of the crosslinking agent by mol of the prepolymer composition.

Preferably the first crosslinked polymer is obtained by polymerising a prepolymer composition comprising 0.1 parts by mol or more of a crosslinking agent with respect to 100 parts by mol of monomers. In order to preserve the mechanical strength of the first crosslinked polymer and increase the stability of the sensor, it is preferred that the first crosslinked polymer is obtained by polymerising a prepolymer composition comprising 0.3 parts by mol or more crosslinking agent with respect to 100 parts by mol of monomers. In an embodiment the first crosslinked polymer is obtained by polymerising a prepolymer composition comprising 0.6 parts by mol or less of the crosslinking agent with respect to 100 parts by mol of monomers.

As disclosed herein, it is advantageous to reduce the amount of (non-cleavable) crosslinking agent in the first crosslinked polymer. However, reducing the amount of (non-cleavable) crosslinking agent negatively affects the mechanical strength of the polymer. Therefore in some embodiments a cleavable crosslinking agent is used together with a crosslinking agent in the preparation of the sensors. In this way, the mechanical strength of the first crosslinked polymer can be preserved during fabrication of the sensor. Then, after the sensor has been formed, the cleavable crosslinking agent is cleaved, leaving only the crosslinks formed by the (non-cleavable) crosslinking agent in the first crosslinked polymer. Therefore less (non-cleavable) crosslinking agent can be incorporated into the final sensor, providing the associated benefits of increased sensitivity and dynamic range, whist the mechanical strength of the first crosslinked polymer is preserved during fabrication of the sensor. Therefore by replacing some (non-cleavable) crosslinking agent with cleavable crosslinking agent or vice versa during the fabrication of the first crosslinked polymer, the sensor can be tuned.

Suitable (non-cleavable) crosslinking agents include, but are not limited to N,N'-methylenebis(acrylamide), 1,4-bis (acryloyl)piperazine, glycerol 1,3-diglycerolate diacrylate and ethylene glycol dimethacrylate.

Most preferably, the (non-cleavable) crosslinking agent is N,N'-methylenebis(acrylamide).

In some embodiments a (non-cleavable) crosslinking agent is also used to form the second crosslinked polymer. Suitable (non-cleavable) crosslinking agents include, but are not limited to N,N'-methylenebis(acrylamide), 1,4-bis(acryloyl)piperazine and ethylene glycol dimethacrylate. Preferably, the (non-cleavable) crosslinking agent utilised to form the second crosslinked polymer is N,N'-methylenebis(acrylamide).

In some embodiments of the invention a cleavable crosslinking agent is used in the manufacture of the first crosslinked polymer.

In an aspect the invention provides a sensor for detecting the presence or measuring the concentration of a target analyte, the sensor comprising:
 (i) a first phase comprising a first crosslinked polymer;
 (ii) a second phase comprising a second crosslinked polymer; and
 (iii) a target analyte recognition agent
the first phase and second phase arranged to form an optical grating;
wherein the first crosslinked polymer is obtained by polymerising a first prepolymer composition comprising 1 mol % or less of a crosslinking agent by mol of the first prepolymer composition and a cleavable crosslinking agent; and subsequently cleaving the crosslinks formed by the cleavable crosslinking agent to provide the first crosslinked polymer.

Suitable cleavable crosslinking agents and the corresponding cleaving agent include, but are not limited to:

Periodate-cleavable crosslinking agents, such as, N'-(1,2-dihydroxyethylene)bisacrylamide, whose crosslinks can be cleaved by periodate salt, such as sodium periodate. Acid-labile crosslinking agents, such as ketal, acetal, orthoester, imine, acylhydrozone, cis-aconityl, and boronate as disclosed in Shao et al. (2012) Ther Deliv 3, 1409-1427. Alkaline-labile crosslinking agents and thermal-labile crosslinking agents, such as 2,6-pyridinediethanol dimethacrylate and as disclosed in Elladiou, M. & Patrickios, C. S. (2016) Chem Commun 52, 3135-3138. Reactive oxygen species (ROS)-labile crosslinking agents, such as thioketal. Redox-labile crosslinking agents, such as disulphide. Enzyme-labile crosslinking agents, such as peptide (-DEVD-, Caspase-3; -PLQLX-, MMP-2; GPLGIAGQX-, MMP-9), collagenase and other protease specific peptides. Photosensitive crosslinking agents such as those disclosed in Debeci, G. & Kahveci, M. U. (2019) Polymer Bull 76, 1471-1487 and Kloxin et al. (2009) Science 324, 59-63; doi:10.1126/science.1169494. Poly(β-amino ester) crosslinking agents, such as those disclosed in McBath, R. A. & Shipp, D. A. (2010) Polymer Chem 1, 860-865. Clickable triazabutadienes such as those disclosed in United States Patent Application 20170320834.

Preferably, the cleavable crosslinking agent is N,N'-(1,2-dihydroxyethylene)bisacrylamide. In this embodiment, it is preferred that the cleaving agent is a periodate salt, preferably sodium periodate.

Therefore, preferably the first crosslinked polymer is crosslinked using a combination of N,N'-methylenebis(acrylamide) and N,N'-(1,2-dihydroxyethylene)bisacrylamide.

In an embodiment the first prepolymer composition comprises 2 mol % or more of the cleavable crosslinking agent by mol of the first prepolymer composition. In an embodiment the first prepolymer composition comprises 3 mol % or less of the cleavable crosslinking agent by mol of the first prepolymer composition. In a highly preferred embodiment the first prepolymer composition comprises from 2.3 to 2.6 mol % of the cleavable crosslinking agent by mol of the first prepolymer composition.

In an embodiment the first prepolymer composition comprises 2 parts by mol or more of the cleavable crosslinking agent with respect to 100 parts by mol of monomers. In an embodiment the first prepolymer composition comprises 3 parts by mol or less of the cleavable crosslinking agent with respect to 100 parts by mol of monomers. In a highly preferred embodiment the first prepolymer composition comprises from 2.3 to 2.6 parts by mol of the cleavable crosslinking agent with respect to 100 parts by mol of monomers.

Prepolymer Composition

By "prepolymer composition" is meant a composition comprising molecules that are capable of forming the crosslinked polymers mentioned herein by polymerisation and crosslinking or by crosslinking. For example, in the case of polymerisation and crosslinking, the molecules may be, for example, monomers, oligomers, or lower molecular weight polymers, or a combination thereof, as well as the crosslinking agent. In the case of crosslinking, the molecules may be, for example, polymers, as well as the crosslinking agent. The prepolymer composition may also comprise components necessary for polymerisation where appropriate, such as a photoinitiator.

Photoinitiator

Suitable photoinitiators include, but are not limited to azobisisobutyronitrile (AIBN), 2,2-dimethoxy-2-phenylacetophenone (DMP), benzoyl peroxide (BP) and camphorquinone (CQ).

Preferably the photoinitiator is 2,2-dimethoxy-2-phenylacetophenone.

Substrate

The invention provides a substrate comprising the sensor according to the invention.

Suitable substrates include, but are not limited to glass, polymethylmethacrylate (PMMA), polydimethylsiloxane (PDMS), polycarbonate, polyesters, polyolefins, polystyrene films or sheets.

Preferably the substrate is a film or a contact lens. Most preferably the substrate is a contact lens.

In an alternative embodiment, it has been advantageously found that the sensor can be used without a supporting substrate. For example, a sensor according to the present invention can be implanted into the skin, akin to a tattoo, and be used to measure target analyte levels, such as glucose.

Array

Multiple sensors in accordance with the invention may be combined to form an array. By "array" is meant a group of at least two different sensors according to the invention. In the array the sensors may be supported on a substrate as defined in this specification. The sensors may differ by comprising different target analyte recognition agents that are for different target analytes. In this way, the array may be used to detect the presence or measure the concentration of multiple target analytes. Therefore the invention provides an array comprising a first sensor according to the invention, the first sensor comprising a first receptor for a first target analyte; and a second sensor according to the invention, the second sensor comprising a second receptor for a second target analyte.

Use

Preferably the target analyte is glucose, and the sensor according to the present invention is used to monitor glucose levels, particularly for the management of diabetes in humans.

Sensors in accordance with the invention may also be used in other ways, such as in miniaturised bioreactors and microfluidic devices, such as described in Miniaturised pH Holographic Sensors for the Monitoring of *Lactobacillus casei* Shirota Growth in a Microfluidic Chip, ACS Sens. 2019, 4, 456-463.

Method

It will be appreciated by a skilled person that in the methods for making a sensor according to the present invention, the optical grating is formed through a so-called double polymerisation, i.e. the second prepolymer composition is introduced into the network of the first crosslinked polymer and then polymerised by photoinitiated polymerisation to form an interpenetrating polymer network. The first crosslinked polymer must therefore be capable of absorbing the prepolymer composition and crosslinking agent of the second crosslinked polymer into its network in this embodiment. The second crosslinked polymer must be capable of being formed by photoinitiated polymerisation.

Features of the prepolymer compositions, as well as amounts and types of monomers and crosslinking agents for producing the first and second crosslinked polymers are as defined in this specification.

The polymerisation of the second prepolymer composition to form the second crosslinked polymer is a function of the standing wave of the radiation used to initiate polymerisation such that a sinusoidal concentration profile of the second crosslinked polymer is formed within the first crosslinked polymer network, modulating the refractive index of the interpenetrating polymer network as a whole to generate the periodic structure of the optical grating. It will be appreciated by a skilled person that the refractive index of the first and second phases may be modulated by controlling the crosslinking density of the first and second crosslinked polymers. Accordingly, by controlling the relative crosslinking density of the first and second crosslinked polymers, a structure having a periodic variation of the refractive index is formed throughout the interpenetrating polymer network, i.e. an optical grating.

Introduction of the second prepolymer composition into the network of the first crosslinked polymer may be achieved by swelling of the first crosslinked polymer, which can be achieved on account of the relatively low crosslinking density of the first crosslinked polymer. Therefore, in a preferred embodiment of the method, prior to introducing the second prepolymer composition into the first crosslinked polymer, the method comprises the step of swelling the first crosslinked polymer network, preferably by immersing the first crosslinked polymer network in a solvent such as water.

It will be appreciated by a skilled person that the conditions of polymerisation of the second crosslinked polymer are controlled such that an optical grating is recorded in the first crosslinked polymer. In a preferred embodiment, the second prepolymer composition comprises a free radical inhibitor, such as L-ascorbic or hydroquinone. In another preferred embodiment, prior to introducing the second prepolymer composition into the first crosslinked polymer, the method comprises the step of aerating the second prepolymer composition. Oxygen molecules inhibit free radicals. Without wishing to be bound by theory, it is believed that inhibiting free radicals during free radical polymerisation help control the polymerisation of the second crosslinked polymer upon laser exposure to maintain the required difference in the refractive indices to develop an optical grating.

In a highly preferred embodiment, a cleavable crosslinking agent is used to make the first crosslinked polymer. In other words, the prepolymer composition may comprise a cleavable crosslinking agent. This preserves the mechanical strength of the first crosslinked polymer during sensor fabrication. In this way, the cleavable crosslinking agent forms crosslinks between polymer chains, which may be subsequently cleaved after the sensor has been fabricated. In other words, subsequent to polymerising the second prepolymer composition, the method comprises cleaving the crosslinks formed by the cleavable crosslinking agent.

Device

Any suitable device may be used to qualitatively or quantitatively measure the wavelength of light diffracted by sensors according to the invention. Any suitable method may then be used to use the measured wavelength to determine the corresponding amount of target analyte. The sensors of the present invention can be tuned so that the light diffracted by the optical grating has a wavelength within the visible region of the electromagnetic spectrum. This enables the light that is diffracted by the optical grating to be monitored without specialised equipment, such as spectrometers. For example, a smartphone equipped with a camera may be able to measure the wavelength of light diffracted by sensors according to the invention.

In an aspect, the invention provides a device programmed to measure the wavelength of light diffracted by a sensor according to the invention, wherein the device measures the wavelength of light diffracted by the sensor and determines the presence and/or concentration of the target analyte on/in the sensor.

Figure 2:
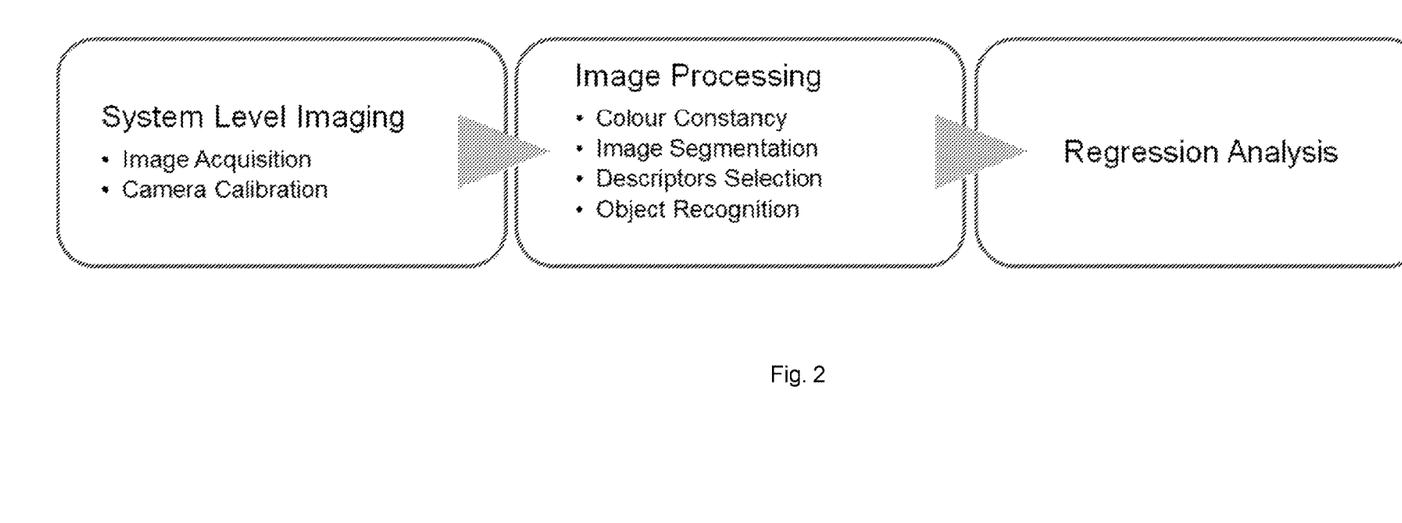
FIG. 2. Is a flow diagram of a process by which a device may measure the wavelength of light diffracted by a sensor according to the present invention.

The device measures the wavelength of light diffracted by the sensor using the following process, which is illustrated in FIG. 2. The initial task is to acquire the colour image of the appropriate sensor using a digital camera. A colour digital image can be defined as an array of both spatially and spectrally sampled points (pixels), in each of which, the quantized colour is described by the primary components of red, green and blue (RGB). The basic RGB primaries retrieved from a captured digital image are derived from long-, middle- and short-wavelength-sensitive colour image sensors, respectively. This implies that the RGB values are device-dependent. Hence, it is necessary to transform device-dependent RGB values to device independent colour coordinates by applying both spectral and colorimetric camera characterization. Afterwards, a two dimensional array of the device-independent coordinates is directed to the image processing module.

The image is then put through four processing steps: colour constancy, image segmentation, descriptors selection and object recognition. In colour constancy, computer algorithms are applied to compensate the effect of the light source. Once the colour corrected image is obtained, mathematical image segmentation algorithms are applied to partition it into homogenous regions with respect to the selected features. Each region is represented and described in the descriptors selection and, ultimately, object recognition techniques classify the distinct regions and determine the Regions of Interest (ROI), where each ROI may correspond to one component within a sensor array.

Next, regression analysis, which refers to establishing the relationship between outputs of the image processor and known concentrations of the target analyte. Once this relationship is expressed as a mathematical model, it can be used to predict analyte concentrations in unknown samples. It will be appreciated by a skilled person that each of the aforementioned modules can be implemented in various ways.

The following Examples illustrate the invention.

Examples

1. Preparation of Sensors
1.1. Baseline Polymer Synthesis (P1)

To prepare a film containing the sensor, a P1 prepolymer composition was prepared with the components shown in Table 1. The P1 prepolymer composition was mixed with 2% (w/v) 2,2-dimethoxy-2-phenylacetophenone (DMPA) in dimethyl sulphoxide (DMSO), then applied to the polyester surface of an aluminised polymer film support and placed face down on a silanised-glass slide. Polymerisation was initiated using UV light (UV LQ400/E—Opsytec Dr. Groebel of wavelength 365 nm) with an exposure time of 25 min. The polymerised film was separated from the support by submerging in a deionised water bath at room temperature and the excess polymer film on the edges removed using a blade. The P1 polymer film was rinsed briefly with deionised water and then washed in a deionised water bath (1 L per slide) for 3 h on a gentle stir. The P1 polymer film was stored in phosphate buffered saline (PBS) prior to the development of the sensor following the double polymerisation method.

To prepare a contact lens containing the sensor, cast moulding was used. The P1 prepolymer composition is applied to the interior mould and then capped with the posterior mould. The assembled mould was exposed to the UV light source through two light guides from both sides of the mould for 10 seconds to polymerise the P1 prepolymer composition. Afterwards, the assembly was immersed in a deionised water bath to separate the finished contact lens. The contact lens was stored in PBS prior to the development of the holographic grating sensor following the double polymerisation method.

TABLE 1

| Ingredient | Function | Amount (mol %) | | |
| --- | --- | --- | --- | --- |
| | | Comparative Example 1 | Example 1 | Example 2 |
| acrylamide | Monomer | 76.7 | 76.7 | 76.7 |
| 3-(acrylamido) phenylboronic acid | Monomer containing the target analyte recognition agent | 11.8 | 11.8 | 11.8 |
| N-[3-(dimethylamino)propyl] methacrylamide | Monomer | 8.6 | 8.6 | 8.6 |
| N,N'-methylenebis (acrylamide) | Crosslinking agent | 2.9 | 0.6 | 0.3 |
| N,N'-(1,2-dihydroxyethylene) bisacrylamide | Cleavable crosslinking agent | 0 | 2.3 | 2.6 |
| Total | | 100 | 100 | 100 |

1.2. Preparation of Sensor

A P2 prepolymer composition was prepared using 63.4 mol % acrylamide and 36.6 mol % N,N'-methylenebis (acrylamide). The solvent contained 64 (v/v %) DMSO, 10.7 (v/v %) ethylene glycol (EG), 21.2% deionised water, 3.2 (v/v %) methanol (MeOH) with 2 (w/v %) Safranin O dye, and 0.9 (v/v %) triethanolamine (TEOL). The P1 polymer was soaked in a deionized water bath for 3 min to stimulate the swelling phase and then cold blow dried for 1 min prior to applying the P2 prepolymer composition to aid penetration of the P2 prepolymer composition into the P1 polymer network. The P2 prepolymer composition (450 µl) was aerated before applying to the P1 polymer film or contact lens because the oxygen molecules inhibit the free radicals and aid control the P2 polymerisation upon laser exposure to maintain the required difference in the refractive indices of light (P1+P2) and dark (P1) fringes to develop a grating. After application, the P1 polymer film or contact lens with P2 prepolymer composition was left for 5 min, then excess solution was wiped off.

A frequency-doubled Nd:YAG laser (20 w, 2J, 10 Hz, 532 nm, Brilliant B, Quantel, France) was used to initiate polymerisation of P2. The laser settings were adjusted to 532 nm, 10 Hz, 400 µs for 10 s exposures. A volume reflection hologram was recorded in the P1 polymer by exposing the P2 prepolymer composition to the laser to polymerise P2. Recording of a volume reflection hologram involved the formation of an interference pattern and its integration in P1 by polymerising the photosensitive P2 prepolymer composition within the network of P1. The laser beam was expanded and collimated to produce a parallel beam that directly illuminated the P2 prepolymer composition (reference beam) and passed through the P2 prepolymer composition and was reflected back through the P2 prepolymer composition by a plane mirror on the other side and thereby formed the object beam. These beams were superimposed to form a sinusoidal interference pattern of irradiance distribution. Polymerisation of the P2 prepolymer composition mimics the interference pattern to form alternating fringes of differing refractive indices.

After laser exposure, the double polymerised sensor was washed in 1:1 (v/v) ethanol: 5 (w/v %) sodium bisulphate for 5 min to remove dye and unreacted P2 monomer.

In Examples 1 and 2, sodium periodate was used to cleave the crosslinks formed by N,N'-(1,2-dihydroxyethylene) bisacrylamide after the sensor had been formed. The sensors were immersed in a 1M sorbitol bath to protect the boronate groups, then sodium periodate was added to the sensors. Subsequently, the sensor was soaked in 1:1 (v/v) ethanol:5% NaHSO$_4$ for 15 min.

The final content of crosslinking agent in P1 in the double polymerised sensor of Comparative Example 1 was 2.9 mol %. The final content of crosslinking agent in P1 in the double polymerised sensor of Example 1 was 0.6 mol %. The final content of crosslinking agent in P1 in the double polymerised sensor of Example 2 was 0.3 mol %.

2. Measurement of Glucose Concentration In Vitro
2.1. Preparation of Glucose Buffer Solutions PBS buffer was prepared by dissolving one PBS tablet in 100 ml deionised water to provide 10 mmol/L phosphate, 2.7 mmol/L potassium chloride and 137 mmol/L sodium chloride solution with pH 7.3 at 25° C. To explore the response of the glucose-sensitive sensors, glucose buffer solutions were prepared in the PBS buffer at room temperature having glucose concentrations in the range of 0-10 mmol. The glucose buffer solutions were used at least 12 h after preparation to ensure the relative proportion of glucose isomers present to mimic the equilibrium in the body fluids.

2.2. Optical Measurements

The response of the sensors prepared in Comparative Example 1 and Examples 1-2 to test glucose buffer solutions was measured using a reflection spectrophotometer (AvaSpec-2048, Avantes) and a white light source (AvaLight DLC) at room temperature. For each test a sensor was placed in a black anti-static weighing boat containing 5 ml of the glucose buffer solution and a 2×5 mm magnet on gentle agitation to avoid overlaying of solutes on the surface of the sensor which could act as a barrier for further glucose molecules to diffuse into the hydrogel. The change in diffraction wavelength was recorded using the spectrophotometer with an integration time of 200 ms. The sensors were allowed to reach equilibrium in between changes in buffer solutions by monitoring the stability of the diffracted wavelength.

3. Results and Discussion 3.1. Measurement of Glucose Concentration In Vitro

Figure 1:
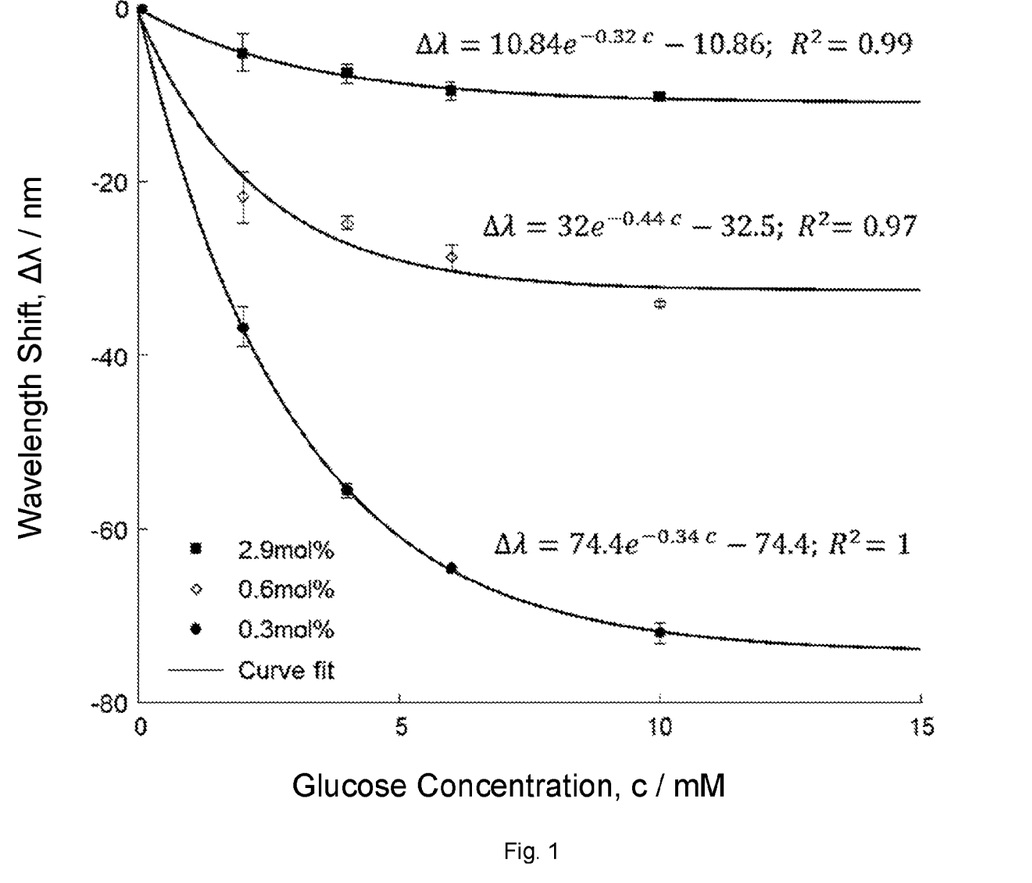
FIG. 1. Is a graph showing the measured difference in peak diffracted wavelength, the so-called wavelength shift ($\Delta\lambda$), as a function of glucose concentration for each of the sensors prepared in Comparative Example 1 and Examples 1-2.

The measured difference in peak diffracted wavelength, the so-called wavelength shift ($\Delta\lambda$), as a function of glucose concentration for each of the sensors prepared in Comparative Example 1 and Examples 1-2 is plotted in FIG. 1. Each data point is the average of 5 measurements on samples in 0, 2, 4, 6 and 10 mmol (mM) glucose concentrations. The measured peak diffracted wavelength at each glucose concentration for the sensors is also presented in Table 2 below.

TABLE 2

| Glucose concentration/ mM | Difference in peak diffracted wavelength ($\Delta\lambda$)/nm | | |
|---|---|---|---|
| | Comparative Example 1 (2.9 mol %) | Example 1 (0.6 mol %) | Example 2 (0.3 mol %) |
| 0 | 0 | 0 | 0 |
| 2 | 5.14 ± 2.31 | 21.75 ± 2.94 | 36.75 ± 2.26 |
| 4 | 7.79 ± 1.58 | 24.73 ± 0.76 | 55.55 ± 0.88 |
| 6 | 9.27 ± 1.34 | 28.69 ± 1.5 | 64.52 ± 0.19 |
| 10 | 10.4 ± 0.29 | 34.08 ± 0.31 | 72.01 ± 1.19 |

An increase in $\Delta\lambda$ for a given change in glucose concentration reflects an increase in sensitivity of the sensor. For example, $\Delta\lambda$ between 0 and 2 mM glucose for the sensor made in Comparative Example 1 is approximately 5 nm (~2.5 nm per mM glucose), whereas $\Delta\lambda$ between 0 and 2 mM glucose for the sensor made in Example 1 is approximately 20 nm (~10 nm per mM glucose), indicating an increase in sensitivity of approximately 4-fold.

Furthermore, a sensor that responds with a detectable wavelength shift across a broader range of glucose concentrations is said to possess a broader dynamic range. When exposed to 10 mM glucose buffer, the sensor made in Comparative Example 1 responded with a $\Delta\lambda$ of 10 nm. By comparison, the sensors made in Examples 1 and 2 responded with a $\Delta\lambda$ of 34 nm and 72 nm, respectively. Therefore the sensors made in Examples 1-2, i.e. in accordance with the invention, contracted in response to glucose concentrations with up to a 7-fold enhanced dynamic range in comparison to the sensor made in Comparative Example 1. This surprising finding suggests that incorporating 1 mol % or less crosslinking agent into polymer P1 dramatically enhances the working range of the sensor compared to sensors prepared with polymer P1 having greater amounts of crosslinking agent, such as 2.9 mol %.

FIG. 1 shows the maximum wavelength shifts (±standard deviation) with respect to the start point of the sensor are exponentially correlated to the glucose concentration:

$$\Delta\lambda = 74.4 e^{-0.34c} - 74.4 R^2 = 1$$

where c is the glucose concentration in mM, $R^2$ is the coefficient of determination, 74.4 nm is the maximum achievable wavelength shift with the sensor of Example 2 and 0.34 nm/min is the average response rate within the examined range.

1. A sensor for detecting the presence or measuring the concentration of a target analyte, the sensor comprising:
   (i) a first phase comprising a first crosslinked polymer;
   (ii) a second phase comprising a second crosslinked polymer; and
   (iii) a target analyte recognition agent;
   the first phase and second phase arranged to form an optical grating;
   wherein the first crosslinked polymer comprises 1 mol % or less of a crosslinking agent by mol of monomers in the first crosslinked polymer.

2. The sensor according to embodiment 1, wherein the first crosslinked polymer comprises 0.3 mol % or more of the crosslinking agent by mol of monomers in the first crosslinked polymer.

3. The sensor according to embodiment 1 or 2, wherein the first crosslinked polymer comprises 0.6 mol % or less of the crosslinking agent by mol of monomers in the first crosslinked polymer.

4. The sensor according to any preceding embodiment, wherein the first crosslinked polymer comprises the target analyte recognition agent.

5. The sensor according to any of embodiments 1 to 3, wherein the second crosslinked polymer comprises the target analyte recognition agent.

6. The sensor according to any preceding embodiment, wherein the target analyte recognition agent is capable of binding to or interacting with glucose.

7. The sensor according to any preceding embodiment, wherein the target analyte recognition agent is selected from a phenylboronic acid, benzoboroxole and 5-amino-2-hydroxymethylphenyl boronic acid.

8. The sensor according to any preceding embodiment, wherein the crosslinking agent is selected from N,N'-methylenebis(acrylamide), 1,4-bis(acryloyl)piperazine and ethylene glycol dimethacrylate, preferably wherein the crosslinking agent is N,N'-methylenebis(acrylamide).

9. The sensor according to any preceding embodiment, wherein the first crosslinked polymer comprises a monomer containing a target analyte recognition agent, preferably wherein the monomer containing a target analyte recognition agent is selected from 3-(acrylamido) phenylboronic acid, 2-(acrylamido) phenylboronic acid, N-(1-Hydroxy-1, 3-dihydro-benzo[c][1,2]oxaborol-6-yl)-acrylamide and methacrylic acid, most preferably wherein the monomer containing a target analyte recognition agent is 3-(acrylamido) phenylboronic acid.

10. The sensor according to any preceding embodiment, wherein the first crosslinked polymer comprises a monomer selected from acrylamide, 2-hydroxyethyl methacrylate, N-[3-(dimethylamino)propyl] methacrylamide and combinations thereof, preferably wherein the monomers comprise a combination of acrylamide and N-[3-(dimethylamino) propyl] methacrylamide.

11. The sensor according to any preceding embodiment, wherein the crosslinking agent is N,N'-methylenebis(acrylamide) and the first crosslinked polymer is a crosslinked copolymer of acrylamide, 3-(acrylamido) phenylboronic acid, N-[3-(dimethylamino)propyl] methacrylamide, and N,N'-methylenebis(acrylamide).

12. The sensor according to any preceding embodiment, wherein the second crosslinked polymer is a crosslinked copolymer of acrylamide and N,N'-methylenebis(acrylamide).

13. A sensor for detecting the presence or measuring the concentration of a target analyte, the sensor comprising:

(i) a first phase comprising a first crosslinked polymer
(ii) a second phase comprising a second crosslinked polymer; and
(iii) a target analyte recognition agent;
the first phase and second phase arranged to form an optical grating;
wherein the first crosslinked polymer is obtained by polymerising a prepolymer composition comprising 1 mol % or less of a crosslinking agent by mol of the prepolymer composition.

14. The sensor according to embodiment 13, wherein the prepolymer composition comprises 0.3 mol % or more of the crosslinking agent by mol of the prepolymer composition.

15. The sensor according to embodiment 13 or 14, wherein the prepolymer composition comprises 0.6 mol % or less of the crosslinking agent by mol of the prepolymer composition.

16. The sensor according to any of embodiments 13 to 15, wherein the first crosslinked polymer comprises the target analyte recognition agent.

17. The sensor according to any of embodiments 13 to 15, wherein the second crosslinked polymer comprises the target analyte recognition agent.

18. The sensor according to any of embodiments 13 to 17, wherein the target analyte recognition agent is capable of binding to or interacting with glucose.

19. The sensor according to any of embodiments 13 to 18, wherein the target analyte recognition agent is selected from a phenylboronic acid, benzoboroxole and 5-amino-2-hydroxymethylphenyl boronic acid.

20. The sensor according to any of embodiments 13 to 19, wherein the crosslinking agent is selected from N,N'-methylenebis(acrylamide), 1,4-bis(acryloyl)piperazine and ethylene glycol dimethacrylate, preferably wherein the crosslinking agent is N,N'-methylenebis(acrylamide).

21. The sensor according to any of embodiments 13 to 20, wherein the prepolymer composition comprises a monomer containing a target analyte recognition agent, preferably wherein the monomer containing a target analyte recognition agent is selected from 3-(acrylamido) phenylboronic acid, 2-(acrylamido) phenylboronic acid, N-(1-Hydroxy-1,3-dihydro-benzo[c][1,2]oxaborol-6-yl)-acrylamide and methacrylic acid, most preferably wherein the monomer containing a target analyte recognition agent is 3-(acrylamido) phenylboronic acid.

22. The sensor according to any of embodiments 13 to 21, wherein the prepolymer composition comprises a monomer selected from acrylamide, 2-hydroxyethyl methacrylate, N-[3-(dimethylamino)propyl] methacrylamide and combinations thereof, preferably wherein the monomers comprise a combination of acrylamide and N-[3-(dimethylamino)propyl] methacrylamide.

23. The sensor according to any of embodiments 13 to 22, wherein the crosslinking agent is N,N'-methylenebis(acrylamide) and the prepolymer composition further comprises acrylamide, 3-(acrylamido) phenylboronic acid, and N-[3-(dimethylamino)propyl] methacrylamide.

24. The sensor according to any of embodiments 13 to 23, wherein the second crosslinked polymer is obtained by polymerising acrylamide and N,N'-methylenebis(acrylamide).

25. A sensor for detecting the presence or measuring the concentration of a target analyte, the sensor comprising:
(i) a first phase comprising a first crosslinked polymer;
(ii) a second phase comprising a second crosslinked polymer; and
(iii) a target analyte recognition agent;
the first phase and second phase arranged to form an optical grating;
wherein the first crosslinked polymer is obtained by polymerising a prepolymer composition comprising 1 parts by mol or less of a crosslinking agent with respect to 100 parts by mol of monomers.

26. The sensor according to embodiment 25, wherein the prepolymer composition comprises 0.3 parts by mol or more of the crosslinking agent with respect to 100 parts by mol of monomers.

27. The sensor according to embodiment 25 or 26, wherein the prepolymer composition comprises 0.6 parts by mol or less of the crosslinking agent with respect to 100 parts by mol of monomers.

28. The sensor according to any of embodiments 25 to 27, wherein the first crosslinked polymer comprises the target analyte recognition agent.

29. The sensor according to any of embodiments 25 to 27, wherein the second crosslinked polymer comprises the target analyte recognition agent.

30. The sensor according to any of embodiments 25 to 29, wherein the target analyte recognition agent is capable of binding to or interacting with glucose.

31. The sensor according to any of embodiments 25 to 30, wherein the target analyte recognition agent is selected from a phenylboronic acid, benzoboroxole and 5-amino-2-hydroxymethylphenyl boronic acid.

32. The sensor according to any of embodiments 25 to 31, wherein the crosslinking agent is selected from N,N'-methylenebis(acrylamide), 1,4-bis(acryloyl)piperazine and ethylene glycol dimethacrylate, preferably wherein the crosslinking agent is N,N'-methylenebis(acrylamide).

33. The sensor according to any of embodiments 25 to 32, wherein the monomers comprise a monomer containing a target analyte recognition agent, preferably wherein the monomer containing a target analyte recognition agent is selected from 3-(acrylamido) phenylboronic acid, 2-(acrylamido) phenylboronic acid, N-(1-Hydroxy-1,3-dihydro-benzo[c][1,2]oxaborol-6-yl)-acrylamide and methacrylic acid, most preferably wherein the monomer containing a target analyte recognition agent is 3-(acrylamido) phenylboronic acid.

34. The sensor according to any of embodiments 25 to 33, wherein the monomers comprise a monomer selected from acrylamide, 2-hydroxyethyl methacrylate, N-[3-(dimethylamino)propyl] methacrylamide and combinations thereof, preferably wherein the monomers comprise a combination of acrylamide and N-[3-(dimethylamino)propyl] methacrylamide.

35. The sensor according to any of embodiments 25 to 34, wherein the crosslinking agent is N,N'-methylenebis(acrylamide) and the monomers are acrylamide, 3-(acrylamido) phenylboronic acid, and N-[3-(dimethylamino)propyl] methacrylamide.

36. The sensor according to any of embodiments 25 to 35, wherein the second crosslinked polymer is obtained by polymerising acrylamide and N,N'-methylenebis(acrylamide).

37. A substrate comprising the sensor according to any preceding embodiment.

38. The substrate according to embodiment 37, wherein the substrate is a contact lens.

39. An array comprising at least two sensors according to any of embodiments 1 to 36.

40. Use of a sensor according to any of embodiments 1 to 36, to monitor the presence of or concentration of an analyte.

41. A method for making a sensor for detecting the presence or measuring the concentration of a target analyte, the method comprising:

(i) polymerising a first prepolymer composition comprising 1 mol % or less of a crosslinking agent by mol of the first prepolymer composition to form a first phase comprising a first crosslinked polymer;
(ii) introducing a second prepolymer composition into the first phase; and
(iii) polymerising the second prepolymer composition to form a second phase comprising a second crosslinked polymer such that an optical grating is formed by the first and second phases;
wherein one of the first and second crosslinked polymers comprises a target analyte recognition agent.

42. The method according to embodiment 41, wherein polymerising the second prepolymer composition comprises recording a volume hologram.

43. The method according to embodiment 41 or 42, wherein the first prepolymer composition further comprises a cleavable crosslinking agent; and the method further comprises:
(iv) subsequent to polymerising the second prepolymer composition, cleaving the crosslinks formed by the cleavable crosslinking agent.

44. The method according to embodiment 43, wherein cleaving comprises reacting the crosslinks formed by the cleavable crosslinking agent with a cleaving agent to cleave the crosslinks formed by the cleavable crosslinking agent.

45. The method according to embodiment 43 or 44, wherein the cleavable crosslinking agent is included in the first prepolymer composition in an amount of 2 mol % or more by mol of the first prepolymer composition.

46. The method according to any of embodiments 43 to 45, wherein the cleavable crosslinking agent is included in the first prepolymer composition in an amount of 3 mol % or less by mol of the first prepolymer composition.

47. The method according to any of embodiments 43 to 46, wherein the cleavable crosslinking agent is N,N'-(1,2-dihydroxyethylene)bisacrylamide.

48. The method according to any of embodiments 44 to 47, wherein the cleaving agent is sodium periodate.

49. The method according to any of embodiments 41 to 48, wherein the first prepolymer composition comprises 0.3 mol % or more of the crosslinking agent by mol of the first prepolymer composition.

50. The method according to any of embodiments 41 to 49, wherein the first prepolymer composition comprises 0.6 mol % or less of the crosslinking agent by mol of the first prepolymer composition.

51. The method according to any of embodiments 41 to 50, wherein the first crosslinked polymer comprises the target analyte recognition agent.

52. The method according to any of embodiments 41 to 50, wherein the second crosslinked polymer comprises the target analyte recognition agent.

53. The method according to any of embodiments 41 to 52, wherein the target analyte recognition agent is capable of binding to or interacting with glucose.

54. The method according to any of embodiments 41 to 53, wherein the target analyte recognition agent is selected from a phenylboronic acid, benzoboroxole and 5-amino-2-hydroxymethylphenyl boronic acid.

55. The method according to any of embodiments 41 to 54, wherein the crosslinking agent is selected from N,N'-methylenebis(acrylamide), 1,4-bis(acryloyl)piperazine and ethylene glycol dimethacrylate, preferably wherein the crosslinking agent is N,N'-methylenebis(acrylamide).

56. The method according to any of embodiments 41 to 55, wherein the crosslinking agent is N,N'-methylenebis(acrylamide) and the first prepolymer composition further comprises acrylamide, 3-(acrylamido) phenylboronic acid, and N-[3-(dimethylamino)propyl] methacrylamide.

57. The method according to any of embodiments 41 to 56, wherein the second prepolymer composition comprises acrylamide and N,N'-methylenebis(acrylamide).

58. The method according to any of embodiments 41 to 47, wherein the first prepolymer composition comprises a monomer containing a target analyte recognition agent, preferably wherein the monomer containing a target analyte recognition agent is selected from 3-(acrylamido) phenylboronic acid, 2-(acrylamido) phenylboronic acid, N-(1-Hydroxy-1,3-dihydro-benzo[c][1,2]oxaborol-6-yl)-acrylamide and methacrylic acid, most preferably wherein the monomer containing a target analyte recognition agent is 3-(acrylamido) phenylboronic acid.

59. The method according to any of embodiments 41 to 58, wherein the first prepolymer composition comprises a monomer selected from acrylamide, 2-hydroxyethyl methacrylate, N-[3-(dimethylamino)propyl] methacrylamide and combinations thereof, preferably wherein the monomers comprise a combination of acrylamide and N-[3-(dimethylamino)propyl] methacrylamide.

60. A method for making a sensor for detecting the presence or measuring the concentration of a target analyte, the method comprising:
(i) polymerising a first prepolymer composition comprising 1 parts by mol or less of a crosslinking agent with respect to 100 parts by mol of monomers to form a first phase comprising a first crosslinked polymer;
(ii) introducing a second prepolymer composition into the first phase; and
(iii) polymerising the second prepolymer composition to form a second phase comprising a second crosslinked polymer such that an optical grating is formed by the first and second phases;
wherein one of the first and second crosslinked polymers comprises a target analyte recognition agent.

61. The method according to embodiment 60, wherein polymerising the second prepolymer composition comprises recording a volume hologram.

62. The method according to embodiment 60 or 61, wherein the first prepolymer composition further comprises a cleavable crosslinking agent; and the method further comprises:
(iv) subsequent to polymerising the second prepolymer composition, cleaving the crosslinks formed by the cleavable crosslinking agent.

63. The method according to embodiment 62, wherein cleaving comprises reacting the crosslinks formed by the cleavable crosslinking agent with a cleaving agent to cleave the crosslinks formed by the cleavable crosslinking agent.

64. The method according to embodiment 62 or 63, wherein the cleavable crosslinking agent is included in the first prepolymer composition in an amount of 2 parts by mol or more with respect to 100 parts by mol of monomers.

65. The method according to any of embodiments 62 to 64, wherein the cleavable crosslinking agent is included in the first prepolymer composition in an amount of 3 parts by mol or less with respect to 100 parts by mol of monomers.

66. The method according to any of embodiments 62 to 65, wherein the cleavable crosslinking agent is N,N'-(1,2-dihydroxyethylene)bisacrylamide.

67. The method according to any of embodiments 63 to 66, wherein the cleaving agent is sodium periodate.

68. The method according to any of embodiments 60 to 67, wherein the first prepolymer composition comprises 0.3 parts by mol or more of the crosslinking agent with respect to 100 parts by mol of monomers.

69. The method according to any of embodiments 60 to 68, wherein the first prepolymer composition comprises 0.6 parts by mol or less of the crosslinking agent with respect to 100 parts by mol of monomers.

70. The method according to any of embodiments 60 to 69, wherein the first crosslinked polymer comprises the target analyte recognition agent.

71. The method according to any of embodiments 60 to 70, wherein the second crosslinked polymer comprises the target analyte recognition agent.

72. The method according to any of embodiments 60 to 71, wherein the target analyte recognition agent is capable of binding to or interacting with glucose.

73. The method according to any of embodiments 60 to 72, wherein the target analyte recognition agent is selected from a phenylboronic acid, benzoboroxole and 5-amino-2-hydroxymethylphenyl boronic acid.

74. The method according to any of embodiments 60 to 73, wherein the crosslinking agent is selected from N,N'-methylenebis(acrylamide), 1,4-bis(acryloyl)piperazine and ethylene glycol dimethacrylate, preferably wherein the crosslinking agent is N,N'-methylenebis(acrylamide).

75. The method according to any of embodiments 60 to 74, wherein the crosslinking agent is N,N'-methylenebis(acrylamide) and the first prepolymer composition further comprises acrylamide, 3-(acrylamido) phenylboronic acid, and N-[3-(dimethylamino)propyl] methacrylamide.

76. The method according to any of embodiments 60 to 75, wherein the second prepolymer composition comprises acrylamide and N,N'-methylenebis(acrylamide).

77. The sensor according to any of embodiments 60 to 76, wherein the first prepolymer composition comprises a monomer containing a target analyte recognition agent, preferably wherein the monomer containing a target analyte recognition agent is selected from 3-(acrylamido) phenylboronic acid, 2-(acrylamido) phenylboronic acid, N-(1-Hydroxy-1,3-dihydro-benzo[c][1,2]oxaborol-6-yl)-acrylamide and methacrylic acid, most preferably wherein the monomer containing a target analyte recognition agent is 3-(acrylamido) phenylboronic acid.

78. The sensor according to any of embodiments 60 to 77, wherein the first prepolymer composition comprises a monomer selected from acrylamide, 2-hydroxyethyl methacrylate, N-[3-(dimethylamino)propyl] methacrylamide and combinations thereof, preferably wherein the monomers comprise a combination of acrylamide and N-[3-(dimethylamino)propyl] methacrylamide.

The invention claimed is:

1. A sensor for detecting the presence or measuring the concentration of a target analyte, the sensor comprising:
   (i) a first phase comprising a first crosslinked polymer;
   (ii) a second phase comprising a second crosslinked polymer; and
   (iii) a target analyte recognition agent;
   the first phase and second phase arranged to form an optical grating;
   wherein the first crosslinked polymer comprises less than 1 mol % of a crosslinking agent by mol of monomers in the first crosslinked polymer.

2. The sensor according to claim 1, wherein the first crosslinked polymer comprises 0.3 mol % or more of the crosslinking agent by mol of monomers in the first crosslinked polymer, and/or wherein the first crosslinked polymer comprises 0.6 mol % or less of the crosslinking agent by mol of monomers in the first crosslinked polymer.

3. The sensor according to claims 1 or 2, wherein the monomers comprise: (i) a monomer containing a target analyte recognition agent, said monomer containing a target analyte recognition agent is selected from the group consisting of 3-(acrylamido) phenylboronic acid, 2-(acrylamido) phenylboronic acid, N-(1-Hydroxy-1,3-dihydro-benzo [1,2]oxaborol-6-yl)-acrylamide and methacrylic acid; and or (ii) a monomer selected from acrylamide, 2-hydroxyethyl methacrylate, N-[3-(dimethylamino) propyl] methacrylamide and combinations thereof.

4. The sensor according to claims 1 or 2, wherein the monomers comprise a combination of acrylamide and N-[3-(dimethylamino) propyl] methacrylamide.

5. The sensor according to claim 1, wherein the crosslinking agent is selected from the group consisting of N,N'-methylenebis (acrylamide), 1,4-bis (acryloyl) piperazine and ethylene glycol dimethacrylate, or wherein the crosslinking agent is N,N'-methylenebis (acrylamide) and the first crosslinked polymer is a crosslinked copolymer of acrylamide, 3-(acrylamido) phenylboronic acid, N-[3-(dimethylamino) propyl] methacrylamide and N,N'-methylenebis (acrylamide).

6. The sensor according to claim 1, wherein the first crosslinked polymer comprises the target analyte recognition agent, or the second crosslinked polymer comprises the target analyte recognition agent and or the target analyte recognition agent is capable of binding to or interacting with glucose, and/or wherein the target analyte recognition agent is selected from a phenylboronic acid, benzoboroxole and 5-amino-2-hydroxymethylphenyl boronic acid.

7. The sensor according to claim 1, wherein the second crosslinked polymer is a crosslinked copolymer of acrylamide and N,N'-methylenebis (acrylamide).

8. An array comprising at least two sensors according to claim 1.

* * * * *